United States Patent Office 3,081,199
Patented Mar. 12, 1963

3,081,199
MODIFIED STARCH PRODUCT FOR COATING CELLULOSIC WEBS
Kelley G. Taylor, Decatur, Ill., assignor to A. E. Staley Manufacturing Company, Decatur, Ill., a corporation of Delaware
No Drawing. Filed Oct. 6, 1959, Ser. No. 844,641
2 Claims. (Cl. 117—156)

This invention relates to the coating of cellulosic webs and especially to process, composition and product through which improved wet-rub resistance may be imparted to a paper pigment coating (or "color") using starch as the adhesive.

In the manufacture of paper, mineral coatings are usually applied to a base paper stock to impart opacity and especially to provide a smooth and receptive surface for printing. Such coatings include a mineral pigment and an adhesive which are applied together in an aqueous dispersion. The adhesive serves to bind the pigment particles to each other and to the surface of the paper. For some applications, it is desirable and even necessary to develop in the coating a substantial resistance to wet-rubbing, i.e., resistance to abrasion when the coating is wet with water. Wet-rub resistance is especially important in paper or paperboard for offset printing and in board for refrigerator food containers.

Starch has been used as the adhesive in the application of mineral coatings on paper. Starch has good color and produces bright coatings of good printing quality. Further, starch has less odor than protein-based adhesives (such as casein) which are also used; starch also has less tendency to foam and to spoil than casein.

Unfortunately, starch has a major shortcoming as an adhesive in paper coating; when starch is used alone, the coatings are not water resistant. Many attempts have been made to improve the water resistance of starch-based coatings rather than to substitute other materials, principally because starch is easy to apply and is inexpensive in addition to the advantages noted. None of the attempts has been fully successful. Many are described on pages 1024 and 1025 of Pulp and Paper by James P. Casey, Interscience Publishers, New York, 1952. As pointed out in this book, such coatings must be heated to excessively high temperatures, generally above the boiling point of water, to cure them. The high temperatures necessary limit the types of paper stock that can be used.

A general object of this invention is to provide a new derivative of starch.

Another object is to provide a method of coating cellulosic webs with starch whereby the coating has greatly improved wet-rub resistance.

A more specific object of the invention is to provide a new paper coating adhesive.

Another specific object is to provide a new, inexpensive process of coating papers that imparts sufficient wet-rub resistance for offset printing.

A further object is to provide a coated paper of improved wet-rub resistance.

Other objects will appear in the following description.

In one aspect, this invention is a coating composition comprising a starch component which assays at least 0.5% by weight of carboxyl group and a water-soluble salt of a metal selected from the group consisting of chromium, zirconium and titanium.

In another aspect the invention is a method of coating a cellulosic web (such as paper) with a pigment and includes the step of applying to the web a coating composition including an adhesive and a pigment. In this method the adhesive comprises a starch component having at least 0.5% carboxyl group by weight. The starch adhesive is brought into contact with a water-soluble salt of a metal of the group consisting of chromium, zirconium and titanium to render the coating water-resistant.

Still another aspect of the invention is a cellulosic web coated with a starch component of the composition referred to, which is rendered resistant to wet-rubbing by contact with a water soluble salt of a metal of the group consisting of chromium, zirconium and titanium.

The starch component containing reactive carboxyl groups may be prepared by a number of different methods. A principal method is the hypochlorite oxidization of starch in which a suspension of granular starch is warmed in the presence of an alkaline bleach and then neutralized. For example, to an aqueous granular starch suspension at about 120 to 125° F. a bleach at a pH of 9.0 containing about 3.3 parts of chlorine to about 5 parts of caustic soda is added. At the conclusion of the reaction the suspension is neutralized to a pH of around 6. The hypochlorite treatment oxidizes a proportion of the hydroxyl groups in the starch molecule to carboxyl. The hypochlorite oxidation will also introduce carboxyl groups into gelatinized starch.

Another method of preparing a modified starch containing carboxyl groups is disclosed in my copending application, Serial No. 817,036, filed June 1, 1959. The method disclosed there comprises reacting granular starch in the presence of water and an alkaline catalyst with an etherifying agent selected from the group consisting of the methyl and ethyl esters of crotonic and itaconic acids and the esters of acrylic acid. This process introduces a sodium carboxyalkyl ether substituent in the starch and, when the product is neutralized with acid, it contains reactive carboxyl groups.

Still other methods of introducing the caboxyl group (as a carboxy alkyl ether) are disclosed in several U.S. patents. In Patent 2,654,736 (Caldwell), a beta-lactone is reacted with granular starch; in Patent 2,660,577 (Kerr) a beta- or a gamma-lactone is reacted with commercially dried granular starch. In Patent 2,773,057 (Hjermstad et al.), a monochlorine-substituted, saturated fatty-acid salt, such as sodium chloroacetate, is reacted with granular starch; the chloroacetate reaction yields a carboxymethyl ether. Still another method produces what is referred to as a dicarboxyl starch. In this method (Patent 2,894,945 to Hofreiter et al.), a periodate-oxidized starch containing dialdehyde groups is treated with a water soluble inorganic salt of chloric acid to oxidize the dialdehyde groups.

The carboxy starch may be based on any of the native starches, corn, potato, wheat, rice, tapioca, sorghum, etc.

Any of the starch modifications resulting from the processes described may be used for the present invention. However, it is preferred to use hypochlorite-oxidized granular starch since this is relatively inexpensive, produces a starch paste of relatively low viscosity and most important, in its spray-dried form, it produces a starch paste in cold water.

The usual procedures employed in preparing paper coating compositions may also be used in accordance with this invention. First, a starch paste is prepared. If the starch pastes in cold water, only mixing is necessary. If it does not paste in cold water, the starch component is cooked in water at about 25–30% solids at an elevated temperature which is frequently above about 150 to 160° F. for 15–20 minutes. In this step the starch is gelatinized, as is well known, the granules swelling in water to form a solution or suspension that is referred to as a paste. A mineral suspension is separately prepared with a high solids content of pigment, for example, this may be a 70% clay slip, the balance being water. The pigment suspension and starch paste are mixed and a dispersant is added to form the coating composition or coating color. Frequently, a soap is added, for example, sodium stearate, to prevent sticking or dusting during the process of supercalendering. Methods of preparing the pigment suspension are described in chapter XVIII of Pulp and Paper referred to before.

In performing the paper coating process of this invention the metal salt may be brought into contact with the carboxyl starch in either of two ways. In the first, the coating color is prepared in the usual way using carboxy starch. The color is applied to the paper web without having the metal salt present. Then, a wash coat, i.e., an aqueous solution of the metal salt, is flowed over the coating to render it insoluble. With a low-solids color, it may be necessary to air-dry the color before applying the wash coat; otherwise drying before application of the wash coat is unnecessary. The metal salt may be such that it reacts immediately with the carboxyl starch to render the starch insoluble or the metal salt may remain latent in the coating unitl the coating is heated to dry it, as is necessary in paper making. The chromium compounds useful in this first procedure include chromium trihalides (particularly the chloride), chromic sulfate, chromic nitrate, chromic acid, chromic acetate, chromic potassium sulfate, etc. The ammonium and alkali metal dichromates and chromates may also be used in this procedure since they are activated in the ordinary drying of the paper coating. The zirconium salts that are effective in this procedure include zirconyl chloride and bromide, zirconyl acetate, zirconium oxalate, zirconium tetrachloride and zirconium sulfate. The zirconium ammonium carbonate complex salt may also be used in this process, being made active in the drying step. (This last salt is prepared from ammonium carbonate and a water-soluble zirconium salt such as the oxychloride or tetrachloride, and it is also available as a prepared solution.) Titanium tetrachloride, or titanium oxalate may be used in this procedure.

To obtain the most rapid penetration of the wash coat into the deposited coating a small amount of a wetting agent, such as a quaternary amine (e.g. octadecyl trimethyl ammonium chloride) may be added to the metal salt solution.

In the second method of bringing the carboxy starch and selected metal into contact, the metal, as a salt, is incorporated in the coating color before it is applied to the paper web. The metal salt is preferably part of the adhesive fraction of the coating composition, i.e., it is included with the starch component. In this case, the color is prepared and applied to the paper web, as described above, and then dried. In the drying the metal salt is activated and reacts with the carboxy starch to render the film insoluble. The salts useful in this procedure include the ammonium and alkali metal chromates and dichromates and zirconium ammonium carbonate. It is necessary in this procedure to keep the metal inactive until the coating color has been applied to the paper web because the metal will otherwise react with the starch in the color before it is applied to the paper. The result is an undue increase in the viscosity of the coating color whereas the desired effect is a low viscosity with a high solids content. In this procedure especially, it is preferred to use the spray-dried, hypochlorite-oxidized starch which pastes in cold water. This composition, a dry potential adhesive comprising the starch component and the metal salt, will normally be packaged as a commercially dry mixture so that the adhesive may be prepared in the conventional manner by the paper mill. Commercially dry starch products may contain up to about 15% moisture, but even under these conditions the composition of this invention is stable on storage.

The proportion of starch conventionally used in coatings of this type may also be used with this invention. The preferred range is about 15 to 20% starch dry substance based on the weight of clay. However, useful results are obtained with as little as 12% starch, and while more than 20% may be used with improved results, this dilutes the pigment deposited and is more expensive. The solids content of the coating composition, which depends on the method used for applying the coating, may be the conventional proportions and 40 to 55% solids is satisfactory. The coating color may contain other additives which are customary in this process such as, for example, a very small amount of a wetting agent or of an agent that suppresses foaming. Frequently, a polymer latex, such as styrene-butadiene, is added to the color to increase dry coating flexibility, and the adhesive of this invention is compatible with such latexes.

The proportion of the selected metal salt to the starch component varies with a number of factors, such as the desired wet-rub resistance, the carboxyl content of the starch and the method used in bringing the metal salt into contact with the starch. When the metal salt is included in the adhesive, as little as 1% of the metal (expressed as oxide) by weight of the dry starch component will improve the wet-rub resistance if the starch component contains at least 1% carboxyl groups. On the other hand, if the carboxyl assay is as low as 0.5%, it is necessary to use more of the metal salt, at least 2% of the metal (expressed as oxide) by weight of the starch content. If the metal salt is used as a wash coat, a 0.5% solution is adequate to improve the wet-rub resistance when the carboxyl content assay is at least 1%. On the other hand, when the carboxyl content is 0.5%, the wash-coat solution should contain at least 1% of the metal (expressed as oxide). In either case, the wet-rub resistance is further improved by increasing the ratio of metal salt to starch component. In using a wash coat, evidently, the time of contact will have considerable influence on the concentration used since the wet-rub resistance depends more on the amount of metal salt that reacts in the coating than on the concentration in the wash-coat solution. The time of contact that can be used conveniently on present paper coating machinery varies with the individual machine, and therefore the concentration of the metal salt solution may have to be adjusted to take this into account.

When paper is to be supercalendered, a soap, such as sodium stearate, is often added to prevent sticking or dusting during the supercalendering operation. The stearate or other long-chain fatty acid used for this purpose not only does not interfere with the process of this invention but, in fact, enhances the water insolubility of the coating and, furthermore, the presence of the soap makes the coating more pliable and flexible. For this reason, it is preferred to include a soap in the coating composition of this invention even though the paper will not be supercalendered. Any of the long chain fatty acids that form soaps may be used for this purpose, such as stearic, palmitic, lauric, oleic, caproic, myristic, etc.

In the carboxyl assay, the starch is first treated with dilute methanolic nitric acid to remove any alkali and to free the acid groups. The starch is then washed free of acid and water with methanol and dried. A weighed sample of the dried starch is then soaked overnight in one normal standardized aqueous sodium hydroxide. The excess sodium hydroxide is then back-titrated with standardized dilute hydrochloric acid to a phenol-phthalein end-point to estimate the amount of sodium hydroxide consumed in neutralizing the carboxyl groups.

In order to characterize the wet-rub resistance of the papers coated in accordance with this invention, the coatings were tested using a modification of routine control method RC-184 of the Technical Association of the Pulp and Paper Industry. This routine control method employs an instrument known as the Taber Abraser. This machine has a horizontal rotating table, to which a sample may be clamped, and a counting mechanism to record the number of rotations of the table. Above the table there is a weighted, pivoted arm on which a rubbing element may be mounted so that it bears against the sample on the sample table during rotation. The pressure exerted by the rubbing element is adjustable by means of counterweights hung from the arm. The routine control method described in the Technical Association issuance employs a brush as the rubbing element. In the tests performed for this invention, a felt-rimmed wheel was used, with the wheel rotating against the surface of the coated paper sample. To determine the wet-rub resistance of a sample, the wheel is saturated with water before the test. After a given number of cycles, the pigment picked up by the wheel is carefully washed into a predetermined volume of distilled water, and the pigment suspended in the volume of distilled water is determined by means of a turbidimeter using distilled water as a standard. Before use, the apparatus is carefully calibrated so that the turbidity measurement represents the amount of pigment removed in the particular number of cycles used in the test. The result is expressed in milligrams of pickup by the wheel.

The following examples are presented to illustrate this invention with the understanding that the invention is not limited to the details disclosed. In these examples all percentages are by weight.

EXAMPLE 1

A starch paste was prepared using a hypochlorite-oxidized starch containing additional carboxyl groups introduced by the method of my copending application referred to before. The assay on the starch was 2.5% carboxyl. The paste contained 42 grams of the starch and 4 grams of ammonium bichromate in 126 grams of water, the final paste containing approximately 25% solids. After cooking, the paste was thoroughly mixed with 300 grams of a 70% solids clay slip to produce a coating color having 20% adhesive based on the weight of the clay and a solids content of about 54%. The color prepared in this manner was applied upon a 0.012 inch sulfite-bleached paperboard by pulling a puddle of the color over the paperboard with a #14 wire wrapped rod.

One sheet prepared in this manner was dried on the drying roll of a Noble and Wood paper machine which heats the coating for three minutes at 190° F. A second sheet was dried in air at ambient temperature and then supercalendered. The supercalender rolls are steam-heated and apply substantial pressure to the paper.

The wet-rub resistance of these two samples was then tested on the Taber Abraser as described above. The amount of pigment pickup in 10 cycles was 14 milligrams for the roll-dried coating and 15.5 milligrams for the supercalendered coating. In the absence of the chromium salt 10 cycles on the Taber Abraser yields a pickup of 36–38 milligrams regardless of whether the paper is roll-dried or supercalendered.

EXAMPLE 2

Using the same ingredients and proportions as in Example 1 but omitting the ammonium bichromate, a clay-pigmented color was prepared and applied as described in Example 1. Within a few seconds after application, a wash coat of chromium trichloride was pulled down over the paperboard with a #14 wire wrapped rod. Three runs were made using chloride solutions in concentrations of 2, 3, and 5%. Duplicate samples of the paperboard were prepared at each chromium trichloride concentration. One of each duplicate was dried on the paper machine (3 minutes at 190° F.) and the other was supercalendered. The results are displayed in Table 1.

*Table 1*

| CrCl₃ Concentration | Roll Dried | | Supercalendered | |
|---|---|---|---|---|
| | 10 Cycles, mg. | 30 Cycles | 10 Cycles, mg. | 30 Cycles, mg. |
| 2% | 13 | 38 mg [1] | 8.5 | 34 |
| 3% | 14 | 32 mg [1] | 7 | 19 |
| 5% | 3 | 12.5 mg | 2 | 7 |

[1] 20 cycles.

EXAMPLE 3

The procedure of Example 2 was repeated except that the coating composition contained 25% of the carboxy starch as the adhesive, based on the weight of the clay. The results are tabulated in Table 2.

*Table 2*

| CrCl₃ Concentration | Roll Dried | | | Supercalendered | | |
|---|---|---|---|---|---|---|
| | 10 Cycles, mg. | 30 Cycles, mg. | 50 Cycles, mg. | 10 Cycles, mg. | 30 Cycles, mg. | 50 Cycles, mg. |
| 2% | 16.5 | 30 | | 7 | 20 | |
| 3% | 3.5 | 13 | 26 | 3 | 11 | |
| 5% | 3 | 9 | 23.5 | 2 | 4 | 13 |

EXAMPLE 4

An adhesive was prepared with 42 grams of hypochlorite-oxidized starch reacted with ethyl acrylate, as described before, so that the total carboxyl assay was 2.1%. The starch component was pasted in aqueous zirconyl ammonium carbonate prepared by dissolving 10 grams of zirconyl chloride ($ZrOCl_2 \cdot 8H_2O$) in 140 milliliters of water and adding ammonium carbonate to a pH of 9. This adhesive was mixed with 300 grams of clay slip containing 70% solids to form the coating composition. This coating composition was applied in the manner described in Example 1 and roll dried as described. The test on the Taber Abraser yielded a pickup of 12 milligrams after 10 cycles and 23.5 miligrams after 20 cycles.

EXAMPLE 5

The procedure of Example 4 was repeated with a spray-dried, highly hypochlorite-oxidized starch, which swells and is soluble in cold water. The carboxyl assay was 1.1%. This cold-water solubility is of advantage since it suppresses any reaction that might take place between the starch and zirconium ion during the cooking of the starch. The pigment pickup on this sample was 8 milligrams after 10 cycles on the Taber Abraser and 27 milligrams after 20 cycles.

EXAMPLE 6

A hypochlorite-oxidized starch was reacted with ethyl acrylate as described in my copending application referred to above and 56 grams of this product (assaying 2.1% carboxyl) was converted to the ammonium salt by acidifying, filtering, resuspending and adjusting the pH to about 9 with ammonium hydroxide. The ammonium carboxyethyl starch was cooked in 86 grams of water to form a paste. To this 10 grams of stearic acid was added. A solution of zirconium ammonium carbonate was prepared by dissolving 7 grams of zirconyl chloride octahydrate in 20 grams of water and added 11 grams of ammonium carbonate. The zirconium solution was mixed thoroughly with the starch paste to form the adhesive. Then the adhesive was mixed with 300 grams of a 70% clay slip and stirred for approximately an hour. The final composition was applied on the paperboard of Example 1 with a #14 wire wrapped rod. The board was then roll dried. The wet-rub resistance was measured on the Taber Abraser and the results were a pickup of 5.5 milligrams of pigment in 10 cycles and 20 milligrams in 30 cycles.

EXAMPLE 7

A commercial aqueous solution of zirconium ammonium carbonate was used as received from the National Lead Company. This contains approximately 10% zirconium dioxide by weight. Forty-two grams of the carboxyethyl starch of Example 6 were converted to the ammonium salt and pasted in a solution of 100 grams of the zirconium ammonium carbonate solution, 10 grams of stearic acid and 60 grams additional of water. The paste was thoroughly mixed with 300 grams of a 70% clay slip. This composition was applied as a coating and the coating was dired as described in Example 6. The wet-rub resistance was determined on the Taber Abraser and the pigment pickup was 3 milligrams after 10 cycles, 4.5 milligrams after 30 cycles and only 13 milligrams after 100 cycles.

EXAMPLE 8

The procedure of Example 2 was repeated except that an 8% solution of zirconyl chloride was substituted for the chromic chloride solution. The coating was air dried only. The test indicated that the pigment pickup was only 1.5 milligrams after 10 cycles and 6 milligrams after 100 cycles.

EXAMPLE 9

The procedure of Example 8 was repeated except that the zirconyl chloride concentration in the wash coat was increased to 10%. The air dried coating was tested on the Taber Abraser and the pigment removed was 1.5 milligrams in 10 cycles and 2.5 milligrams in 100 cycles.

EXAMPLE 10

The procedure of Example 8 was repeated except that a 10% solution of zirconium tetrachloride was substituted for the zirconyl chloride. The air dried coating was tested on the Taber Abraser and the pigment removed was 1.5 milligrams after 10 cycles and 2.5 milligrams after 100 cycles.

EXAMPLE 11

The procedure of Example 9 was repeated except that the starch used was a conventional hypochlorite-oxidized starch that was not further modified. The carboxyl assay was 1.1%. After roll drying, the coating was tested and the pigment removed was only 8.5 milligrams after 100 cycles.

EXAMPLE 12

The two-coat procedure was repeated using a 5% dicarboxyl starch. (The 5% refers to the number of dicarboxyl units per 100 anhydroglucose units.) A 4% zirconium tetrachloride solution was applied as a wash coat. After drying the coating was tested on the Taber Abraser and the pigment removed was 1 milligram after 100 cycles and 2 milligrams after 200 cycles. The excellent result with this starch component is attributable to the high carboxyl content.

EXAMPLE 13

The procedure of Example 12 was repeated except that a 4% zirconyl chloride solution was substituted. After drying the coating was tested and the pigment removed was 1.5 milligrams after 10 cycles and 2.5 milligrams after 100 cycles.

EXAMPLE 14

The procedure of Example 2 was repeated except that the starch concentration was changed to 16% of the clay and a zirconium acetate solution assaying 4% $ZrO_2$ was substituted for the chromium chloride. The test indicated that only 4.5 milligrams of pigment was removed in 100 cycles.

EXAMPLE 15

Using the carboxyethyl starch of Example 1 but with a carboxyl assay of 0.57% (blank equals 0.22%) a series of coatings were prepared at varying zirconyl chloride contents. The results show that a measurable improvement in wet-rub resistance was obtained at this small carboxyl content and that the wet-rub resistance was further improved as the concentration of the zirconyl chloride was increased. The results obtained with an 8 and a 10% zirconyl chloride were slightly worse than the results obtained in Example 4 whereas the results obtained with a 4% solution were about 20% better than the blank (no zirconium solution wash).

While the examples given have for simplicity been limited to a paper-coating clay as the pigment, I have used others of the conventional pigments, such at titanium dioxide, calcium carbonate, etc., with equally good results.

This invention is also useful as a finish for cotton fabrics. It imparts to the fabrics the same hand and pleasing appearance desired in the finished goods that starch does. However, it lasts much longer on repeated washings than starch which ordinarily is removed in the first few washings. Of course, in the use of this invention, the mineral pigment and other additives necessary for paper coating are not used.

Since many embodiments may be made of this invention and since many changes may be made in the embodiments described, the scope of this invention is not to be limited to the details disclosed but it is set forth in the claims following hereafter.

I claim:

1. The method of coating paper with a wet-rub resistant, pigmented coating that comprises providing an aqueous coating color containing the pigment, a small proportion of a long chain, soap-forming fatty acid and from 12 to 25% pasted starch based on the weight of pigment, said starch having as its active acidic group, at least 0.5% carboxyl groups, depositing said coating color on the paper web, then applying to the deposited coating color an aqueous solution of a chromium salt containing at least 0.5% chromium, expressed as oxide, when said starch has 1% carboxyl group and at least 1% chromium, expressed as oxide, when said starch has 0.5 to 1.0% carboxyl groups, and drying the coating, whereby the chromium reacts with the starch in situ and insolubilizes it, said chromium salt being selected from the group consisting of chromium trihalides, chromic sulfate, chromic nitrate, chromic acetate, chromic potassium sulfate, chromic acid and the ammonium and alkali metal chromates and dichromates.

2. The method of coating paper with a wet-rub resistant, pigmented coating that comprises providing an aqueous coating color containing the pigment, a small proportion of a long chain, soap-forming fatty acid and from 12 to 25% pasted starch based on the weight of pigment, said starch having as its active acidic group, at least 0.5% carboxyl groups, said color also including dissolved in the water phase thereof a water-soluble chromium salt in a concentration of at least 1% chromium, expressed as oxide, based on starch when the starch has at least 1% carboxyl groups and of at least 2% when the starch has 0.5 to 1% carboxyl groups, depositing said coating color on the paper web and drying the color to cause a reaction in situ between the chromium and said starch to insolubilize it, said chromium salt being selected from the group consisting of the alkali metal and ammonium chromates and dichromates.

References Cited in the file of this patent

UNITED STATES PATENTS 1,745,134    White _____ Jan. 28, 1930

(Other references on following page)

UNITED STATES PATENTS

| | | |
|---|---|---|
| 2,111,204 | Caesar | Mar. 15, 1938 |
| 2,359,858 | Iler | Oct. 10, 1944 |
| 2,432,195 | Hansen | Dec. 9, 1947 |
| 2,489,651 | Langkanmerer | Nov. 29, 1949 |
| 2,565,686 | Hill | Aug. 28, 1951 |
| 2,599,620 | Filbert | June 10, 1952 |
| 2,654,736 | Caldwell | Oct. 6, 1953 |
| 2,660,577 | Kerr | Nov. 24, 1953 |
| 2,773,057 | Hjermstad | Dec. 4, 1956 |
| 2,788,293 | Caldwell | Apr. 9, 1957 |
| 2,894,945 | Hofreiter | July 14, 1959 |
| 2,903,391 | Kerr | Sept. 8, 1959 |

UNITED STATES PATENT OFFICE
CERTIFICATE OF CORRECTION

Patent No. 3,081,199 March 12, 1963

Kelley G. Taylor

It is hereby certified that error appears in the above numbered patent requiring correction and that the said Letters Patent should read as corrected below.

Column 1, line 34, for "unforunately" read -- unfortunately --; column 2, line 40, for "caboxyl" read -- carboxyl --; column 3, line 32, for "unitl" read -- until --; column 7, line 20, for "dired" read -- dried --; column 8, line 27, for "the", first occurrence, read -- this --.

Signed and sealed this 11th day of February 1964.

(SEAL)
Attest:

ERNEST W. SWIDER
Attesting Officer

EDWIN L. REYNOLDS
Acting Commissioner of Patents